J. E. WEBSTER.
FLEXIBLE CONNECTION FOR COÖPERATING MEMBERS.
APPLICATION FILED DEC. 3, 1906.
931,165.
Patented Aug. 17, 1909.
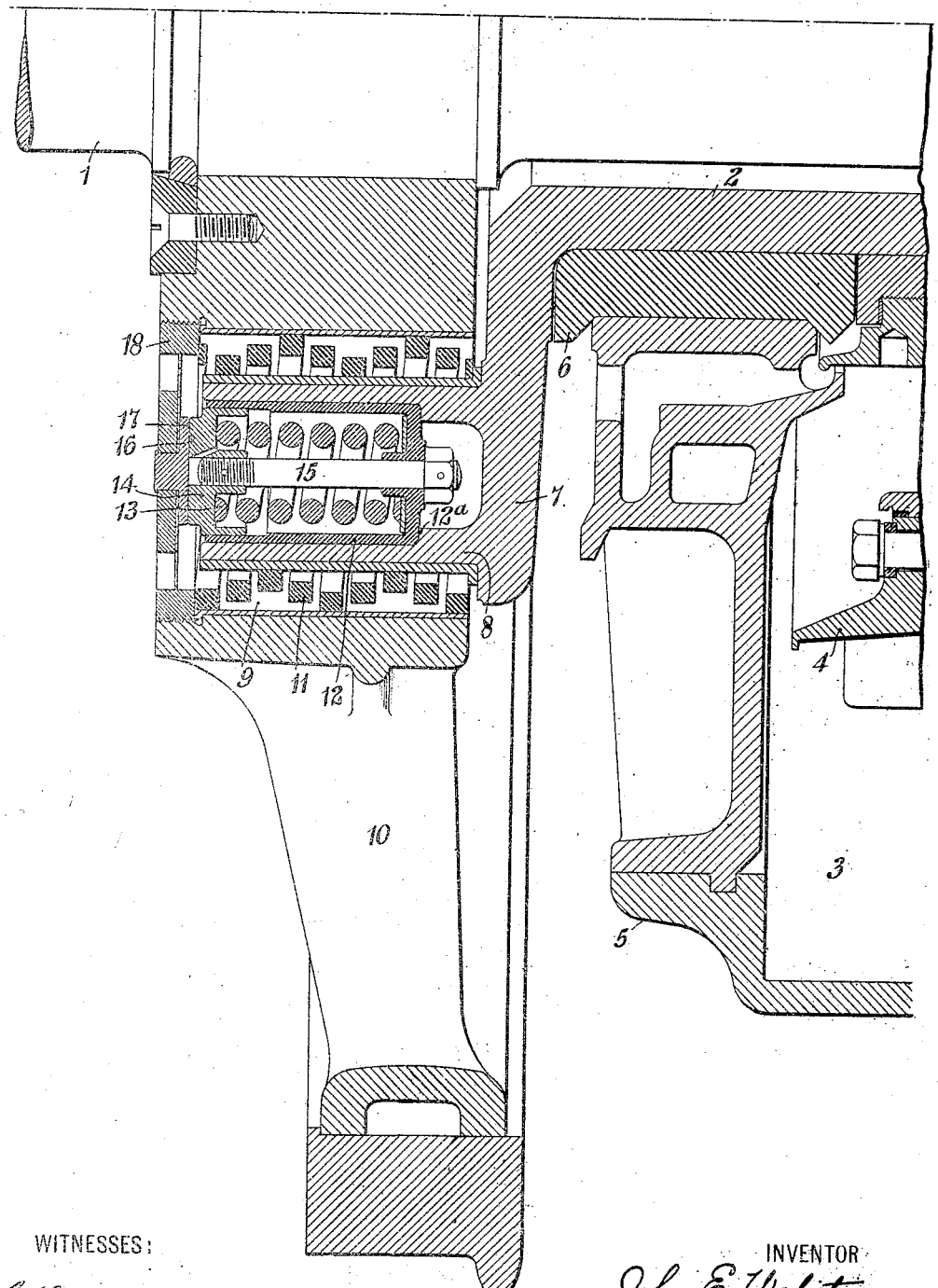
WITNESSES:
C. L. Belcher
Otto S. Schairer
INVENTOR
John E. Webster
BY
Wesley G. Carr
ATTORNEY.

UNITED STATES PATENT OFFICE.

JOHN E. WEBSTER, OF PITTSBURG, PENNSYLVANIA, ASSIGNOR TO WESTINGHOUSE ELECTRIC & MANUFACTURING COMPANY, A CORPORATION OF PENNSYLVANIA.

FLEXIBLE CONNECTION FOR COÖPERATING MEMBERS.

No. 931,165.  Specification of Letters Patent.  Patented Aug. 17, 1909.

Application filed December 3, 1906. Serial No. 346,083.

*To all whom it may concern:*

Be it known that I, JOHN E. WEBSTER, a citizen of the United States, and a resident of Pittsburg, in the county of Allegheny and State of Pennsylvania, have invented a new and useful Improvement in Flexible Connections for Coöperating Members, of which the following is a specification.

My invention relates to resiliently connected members and particularly to connections between electric motors and the parts driven thereby.

The object of my invention is to provide resilient cushioning means for absorbing the energy of relative longitudinal movements of two members that shall be simple in construction and less liable to injury and rupture than others heretofore employed.

In a patent No. 816,612 granted to the Westinghouse Electric & Manufacturing Company, upon an application filed by Robert Siegfried, is set forth a resilient connection between the driving wheels of a vehicle and a quill that loosely surrounds the driving axle upon which the propelling motors are mounted, the said connection comprising means for absorbing the energy of relative longitudinal motion between the axle and the quill. The specific means employed in the patent referred to comprises helical compression springs that are interposed between the ends of the quill and the driving wheels, but these are so mounted as to be subject to transverse strains and are therefore liable to derangement and rupture. According to the present invention, the cushioning means is so constructed that it is not liable to derangement and rupture and is more satisfactory in service than the aforesaid means.

The single figure of the accompanying drawing is a view, in transverse section, of a portion of an electric motor and means for mounting the same that embody my invention.

Loosely surrounding the driving axle 1 of a vehicle, is a quill 2 upon which is mounted an electric motor 3, the armature 4 of which is rigidly secured to the quill. The field magnet frame 5 of the motor is so supported upon the quill, by means of bearings 6, as to permit of relative rotation between the same and the quill, and is prevented from rotation by any suitable means (not shown). The end of the quill is provided with an annular flange or radial arms 7 from which cylindrical bosses or studs 8 project into chambers 9 in a driving wheel 10 that is mounted upon the axle 1. The bosses 8 are surrounded, within the chamber, by springs 11, such as form the subject-matter of Patent No. 817,133 granted to the Westinghouse Electric & Manufacturing Company, as assignee of Robert Siegfried, though other suitable resilient cushioning means may be employed, if desired. The bosses 8 are hollow and contain cylindrical receptacles 12 of cup shape that are seated against a shoulder $12^a$ provided by a reduction in the internal diameter of the boss. The receptacles 12 contain helical compression springs 13 and pistons 14 at the outer ends thereof, rods or bolts 15 that are attached to the pistons and extend through openings in the inner ends of the receptacles. The pistons 14 are provided with wearing surfaces 16 that engage corresponding wearing surfaces 17 on the covers 18 for the outer ends of the chambers 9.

When there is relative transverse motion between the axle 1 and the quill 2, the engaging faces 16 and 17 simply slide over one another and produce no distortion of or transverse strains upon the springs 13. When relative longitudinal movement between the axle and the quill occurs, the pistons 14 will be moved inwardly against the pressure of the springs 13, which are thereby caused to absorb the energy of such movement. By inclosing the springs 13 as set forth, they may be placed under a slight initial compression before the receptacles are placed in the cylindrical openings in the bosses, and, consequently, no difficulties arise from this source during the assembling of the structure. The receptacles 12 may be readily removed, if the parts 14 and 17 become worn from use, and replaced by new parts.

I claim as my invention:

1. The combination with a member having a chamber, a coöperating member having a hollow boss that projects into the chamber, and resilient means surrounding the boss within the chamber, of a cylinder within the boss, a piston therefor that engages the end wall of the chamber and a helical spring between the piston and the inner end of the cylinder.

2. The combination with a member having a chamber, a coöperating member having a hollow boss that projects into the chamber, and resilient means surrounding the boss within the chamber, of a cylinder within the boss, a piston in the outer end of the cylinder that engages the end wall of the chamber, a helical spring within the cylinder, and a rod that projects through the inner end of the cylinder and is attached to the piston.

3. The combination with a member having a chamber, a coöperating member having a hollow boss that projects into the chamber, and resilient means interposed between the adjacent side surfaces of the boss and the chamber, of a cylinder within the boss having a piston and coöperating resilient means for absorbing the energy of relative longitudinal motion between the members.

4. The combination with a member having a chamber, a coöperating member having a hollow boss that projects into the chamber, and resilient means interposed between the adjacent side surfaces of the boss and the chamber, of a cylinder within the boss containing resilient means, and a piston in the outer end of the cylinder having a piston rod that extends through the inner end of the cylinder.

5. The combination with a wheel having a cylindrical chamber and a driving member having a hollow stud or boss located in said chamber, of a cushioning means surrounding said stud or boss, a spring within said stud or boss and a piston interposed between the outer end of said spring and the outer end wall of the chamber.

6. The combination with a rotatable member having a chamber, and a coöperating member having a hollow stud located in said chamber, a cushioning means surrounding said stud within the chamber, a piston in the outer end of the stud and a spring located in the stud and serving to hold the piston in engagement with the end wall of the chamber.

7. The combination with a wheel having a cylindrical chamber, and a driving member having a cylindrical hollow stud of smaller diameter, of a resilient cushion interposed between the adjacent cylindrical surfaces of the chamber and the stud, a cylinder within the stud, a piston in the cylinder that engages one end of the chamber, and a helical spring between the piston and the inner end of the cylinder.

In testimony whereof, I have hereunto subscribed my name this 28th day of November, 1906.

JOHN E. WEBSTER.

Witnesses:
OTTO S. SCHAIRER,
BIRNEY HINES.